B. JACKSON.
Horse Hay-Fork.
No. 197,137. Patented Nov. 13, 1877.
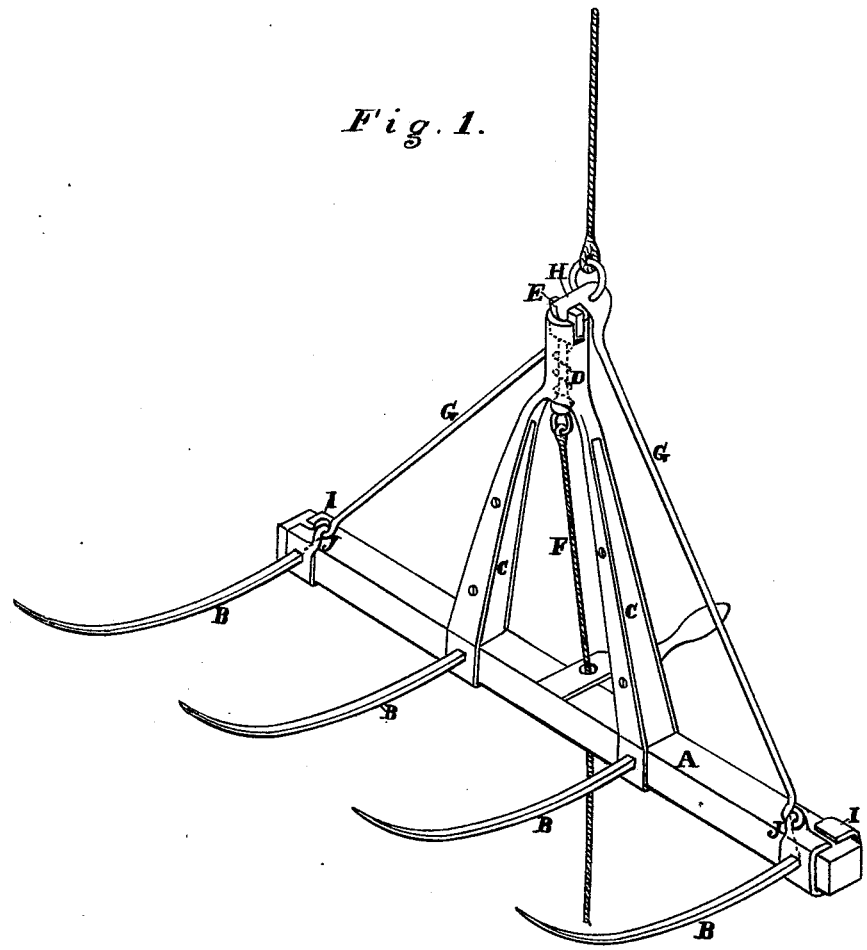

UNITED STATES PATENT OFFICE.

BYRON JACKSON, OF WOODLAND, CALIFORNIA.

IMPROVEMENT IN HORSE HAY-FORKS.

Specification forming part of Letters Patent No. 197,137, dated November 13, 1877; application filed September 19, 1876.

*To all whom it may concern:*

Be it known that I, BYRON JACKSON, of Woodland, county of Yolo, State of California, have invented an Improvement in Horse Hay-Forks for handling headings, straw, or hay; and I do hereby declare the following description and accompanying drawings are sufficient to enable any person skilled in the art or science to which it most nearly appertains to make and use my said invention or improvement without further invention or experiment.

My invention relates to certain improvements in horse hay-forks, whereby the fork can be made somewhat lighter and very much stronger.

Referring to the accompanying drawing for a more complete explanation of my improvement, the figure shows a perspective view of my fork.

A is the head of the fork, which is made of wood, and B are the tines, these tines passing through the head and being properly secured. C C are two arms projecting from the head nearly at right angles with the tines, and these arms serve to lift or drag the load upon the fork. They may be made of wood and covered with metal, or entirely of metal, as may be desired, but in either case the metal portion passes around and clasps the head, and their position is such that the central pair of tines pass through the metal as shown, thus relieving the wooden head of the strain of these tines when loaded.

The upper ends of the arms C are joined to a short cylindrical or other shaped case, D, which has a hole bored through it. The upper end of this cylinder is slotted to receive the bolt E, which has an elongated head or stop, which is guided and supported in the slot. This stem passes down through the hole, and is surrounded by a spiral spring which tends to force the bolt out. It is retracted by means of a cord, F, attached to a ring at its lower end, and the T-shaped head thus serves to prevent the bolt from being retracted so far as to compress and destroy the elasticity of the spring. The slot in the head D forms two strong sides, which project above the head E, and these sides protect the bolt from being bent, and resist the strain which the latch brings to bear upon the bolt-head.

The bail G G, by which the fork is lifted, has a latch, H, secured to its upper end, and this latch projects over the bolt E, so that the bolt holds the bail against the arms C, in position for lifting the load. A ring in the upper part of the bail serves for the attachment of the rope by which the load is lifted.

The ends of the bail are secured to clips I, which clasp the head A, near the ends, and the two outer tines pass through these clips. The clips have each an eye, J, forged upon their inner and front corner, and the object of this eye is to connect the bail with the clip and fork-head. As the tines pass through the center of the clip, it is necessary to prevent the strain of the load upon the bail from pulling the clips over sidewise, and thus cutting into the wood of the fork-head; and this is done by so placing the eye J upon the clips, that it will be in a line with the bail and the tine, and the strain is thus prevented from twisting or turning the clip.

By this construction I am enabled, by passing the inner tines B, through the irons forming the arms C, to transfer nearly all strain from the head A to the arms, and by securing the ends of the bail to the eye on the clip I, through which the outer tines pass, to lessen the twisting strain upon the head and bring the strain of the load in a line between the tine and bail. By means of the stop on the bolt E, I prevent undue strain upon the spring which is within the case D, and also upon the bolt; the whole combination of the central arched arms C, clasping the head between the center and the ends, and the clips at the end, with their peculiarly-arranged eyes to receive the bail, producing a strong and durable fork in which but little strain comes upon the head, and I am enabled to make it longer, stronger, and lighter.

Having thus described my invention, I do not claim, broadly, the tine passing through a central arm, nor the end clips having an eye to receive the bail; nor do I claim the use of a latch to connect or disconnect the bail and the arms C; but

What I do claim, and desire to secure by Letters Patent, is—

1. The fork-head A, in combination with the converging arms C, clasping the head and receiving the inner tines, and the clips I, having the exterior tines passing through them, said clips being provided with the eyes J, for the attachment of the bail in a line with the tine, so as to relieve the head from strain and wear, substantially as herein described.

2. The clips I, clasping the ends of the fork-head, and having the tines B passing through their center, said clips having the eyes J placed upon their inner corners, and in a line between the bail and the centrally-placed tines, substantially as and for the purpose described.

In witness whereof I have hereunto set my hand and seal.

BYRON JACKSON. [L. S.]

Witnesses:
CHAS. D. BEACH,
HENRY SCHRIBER.